US012661960B2

(12) United States Patent
Giret et al.

(10) Patent No.: US 12,661,960 B2
(45) Date of Patent: Jun. 23, 2026

(54) DEVICE FOR CLOSING OFF AN APERTURE IN THE BODY OF A VEHICLE, AND CORRESPONDING VEHICLE

(71) Applicant: ADVANCED COMFORT SYSTEMS FRANCE SAS - ACS FRANCE, Bressuire (FR)

(72) Inventors: Frédéric Giret, Boisme (FR); Anthony Jean, Haute-Goulaine (FR); Maxime Nee, Bressuire (FR)

(73) Assignee: ADVANCED COMFORT SYSTEMS FRANCE SAS—ACS FRANCE, Bressuire (FR)

( * ) Notice: Subject to any disclaimer, the term of this patent is extended or adjusted under 35 U.S.C. 154(b) by 0 days.

(21) Appl. No.: 18/835,025

(22) PCT Filed: Feb. 3, 2023

(86) PCT No.: PCT/EP2023/052707
§ 371 (c)(1),
(2) Date: Aug. 1, 2024

(87) PCT Pub. No.: WO2023/148342
PCT Pub. Date: Aug. 10, 2023

(65) Prior Publication Data
US 2025/0214398 A1     Jul. 3, 2025

(30) Foreign Application Priority Data

Mar. 2, 2022     (EP) ..................................... 22155083

(51) Int. Cl.
B60J 1/08          (2006.01)
B60J 1/16          (2006.01)
E05D 15/06          (2006.01)

(52) U.S. Cl.
CPC ................. B60J 1/085 (2013.01); B60J 1/16 (2013.01); E05D 15/0682 (2013.01); E05D 15/0691 (2013.01); E05Y 2900/55 (2013.01)

(58) Field of Classification Search
CPC .. B60J 1/085; B60J 1/16; B60J 1/1853; E05D 15/0682

(Continued)

(56) References Cited

U.S. PATENT DOCUMENTS 5,799,449 A * 9/1998 Lyons ........................ B60J 1/16
52/204.51
7,063,374 B1 * 6/2006 Cameron ................ F41H 5/226
89/36.02

(Continued)

FOREIGN PATENT DOCUMENTS

EP          0 778 168 B1      6/2001
EP          0857844 B1      12/2002

(Continued)

*Primary Examiner* — Marcus Menezes
(74) *Attorney, Agent, or Firm* — S. J. Intellectual Property Limited

(57) ABSTRACT

The invention relates to a device (1) for closing off an opening in a stationary portion (110), and at least one sliding movable panel (120) guided along two guide rails (111a, 111b) mounted on one face of the stationary panel (110), between a closed position in a first plane defined by said stationary panel (110), and at least one open position in a second plane, substantially parallel to the first plane. Each of the guide rails (111a, 111b) carries at least one shuttle (123a, 123b), which is translationally movable in said guide rails (111a, 111b). According to the invention, at least one of the guide rails (111a, 111b) carries a removable guide element (112) with a length (L) at least equal to the length (L') of the shuttle (123a, 123b), such that, when the guide element is removed, the shuttle (123a, 123b) can be disengaged from the guide rail (111a, 111b).

6 Claims, 3 Drawing Sheets

(58) Field of Classification Search
USPC .......................................................... 49/413
See application file for complete search history.

(56) References Cited

U.S. PATENT DOCUMENTS

2005/0044799 A1\* 3/2005 Kinross ............... E05D 15/1047
49/413
2013/0167445 A1 7/2013 Jincheleau et al.

FOREIGN PATENT DOCUMENTS

FR 2910519 A1 6/2008
FR 2961548 A1 12/2011
GB 696860 A 9/1953
WO 2010/146185 A2 12/2010

\* cited by examiner

DEVICE FOR CLOSING OFF AN APERTURE IN THE BODY OF A VEHICLE, AND CORRESPONDING VEHICLE

FIELD OF THE INVENTION

The field of the invention is that of aperture equipment, used in particular in motor vehicles.

More specifically, the invention relates to devices for closing off an aperture formed in a structural element, for example in the body of a vehicle, or in a door of the vehicle, and comprising a sliding movable portion capable of clearing or closing an opening while offering a flush appearance, when viewed from the outside.

In particular, the invention can equip different types of structures, such as caravans, campervans, coaches and buses, minibuses, trucks, vans, boats, etc.

Such devices, developed for several years by the Applicant of the present application, are known in particular as "flush aperture".

In other words, these devices are designed so as to have, when viewed from the outside, a flush or almost-flush appearance between the body, or more generally the wall or the structure, and the stationary panel of the device.

PRIOR ART

The general principle of this technique is described in particular in the patent documents EP-0 778 168 and EP-0 857 844.

The closure device (hereinafter so-called "flush aperture") comprises a stationary portion and a portion movable relative to this stationary portion, or sliding panel.

The movable portion is connected to the stationary assembly by functional elements which ensure the required mobility and which are attached onto the face of the stationary portion directed towards the inside of the vehicle.

These functional elements, or rails, ensure a function of guiding and holding the movable panel. They are placed on the face directed towards the inside of the vehicle, away enough from the edges, or from the periphery, of the stationary portion so that this periphery could be secured directly to the edges of the aperture, without the rails interfering. Thus, it is possible to dispense with the presence of a connecting frame between the edges of the aperture and the stationary portion.

This stationary portion may be made of one or more element(s) (placed next to one another in the same plane), for example made of glass or polycarbonate.

Thus, such a flush aperture can be entirely mounted independently of the vehicle, and attached, from the outside, in the compartment defined to this end by the aperture, or the compartment defined in the body, or more generally in the wall.

The edges of the stationary portion are secured, for example by means of an adhesive bead, to the edges of the aperture, without any other intermediate connecting element.

In aesthetic terms, the flush aperture has a smooth, flush appearance, when viewed from the outside, because no frame is necessary on the contour of the opening formed in the stationary assembly.

To ensure movement of the movable portion, generally consisting of a transparent panel, a guide device is therefore provided including first and second guide rails fixedly mounted on the stationary portion (or stationary structure) the aperture, on both sides of the opening closed by the movable panel.

The movable panel is mounted on the rails, to slide for example according to a longitudinal direction, in a sliding plane between one (or more) opening position(s) and a closed position, in which it closes off the opening.

To maximise the flush appearance, it has been proposed that, in the closed position, the movable panel is inscribed within the plane of the stationary portion, by passing from an intermediate disengagement position, in the sliding plane, opposite the opening and disengaged from the latter into the closure position.

It should be noted that the term "plane" should herein be understood in a broad acceptance: the plane formed by the aperture is sometimes curved, according to one, or two, direction(s) to adapt to the shape of the structure (this also justifies, in some cases, the term "substantially" used in the description and the claims).

The movable panel can be moved manually or using an electric motor. In the latter case, actuating means act on the movable panel in order to move the latter between a closed position and at least one open position. In particular, the actuation means may be in the form of a cable (so-called Push-Pull cable) connected to the electric motor so as to pull or push the movable panel. The actuating means may also be in the form of a rack or bicycle cable type cables.

To promote opening and closure of the movable panel, a known technique consists in implementing, in each of the guide rails, a shuttle translationally guided in the rail, as described, for example, in the patent document WO2010/146185. Each shuttle allows controlling the movement of the movable panel, on the one hand, to release it or to inscribe it within the opening formed in the stationary panel (Y axis) and, on the other hand, to slidably guide it (X axis). Such a shuttle may comprise two guide tracks able to cooperate respectively with two stationary pins carried by the movable panel, or vice versa.

The cooperation of the guide tracks with the stationary pins allows obtaining an offset, conventionally a sway, of the movable panel so as to move the lateral edges of the movable panel relative to the stationary portion.

As mentioned hereinabove, the aperture is assembled before being fastened at the opening formed in the structure. In general, fastening of the opening in the structure is done by gluing.

One drawback of this technique lies in the fact that dismounting thereof is consequently relatively complex. Indeed, to dismount the aperture off the structure, for example to intervene on a shuttle or replace the movable panel, It is necessary to completely cut/section/remove/scrape the glue holding the aperture in position against the structure. It is also necessary to remove the entirety of the lining to enable removal of the entire aperture. Once the intervention has been completed, it is necessary to replace the entire device, with a new glue joint.

These operations are complex, time-consuming and might generate defects afterwards, in particular aesthetic defects, on the receiving structure and/or on the aperture.

Consequently, the aperture maintenance operations are made very difficult since a complete removal of the rack is necessary irrespective of the encountered technical problem (for example in the case of breakage of the glass of the movable panel, a problem on a return spring or on a drive or synchronisation cable, etc.).

Hence, there is a need to provide a device for closing off an aperture allowing facilitating and optimising the aperture maintenance operations after fastening on the structure.

Nonetheless, the technical solution should not induce detrimental and undesirable effects that might degrade the efficiency and the reliability of current apertures.

SUMMARY OF THE INVENTION

The technique of the invention allows solving at least some of the drawbacks raised by the prior art. More specifically, the invention relates to a device for closing off an aperture formed in a structure, comprising a stationary portion, in which an opening is defined, and at least one sliding movable panel guided along two rails mounted on a face of said stationary panel, between a closure position, closing off said opening, in a first plane defined by said stationary panel, so-called closure plane, and at least one opening position, in a second plane, so-called sliding plane, substantially parallel to said closure plane. Each of said guide rails carries at least one shuttle translationally guided in said rail, translationally movable in said guide rails, and ensuring passage of the movable panel from said closure position into said at least one sliding position, and vice versa, and the sliding movement of said movable panel in said closure plane.

According to an aspect of the invention, at least one of said guide rails carries a removable guide element with a length at least equal to the length of said shuttle, allowing, when removed, disengaging said shuttle from said guide rail.

In this manner, a portion of one of the guide rails can be moved and/or removed so as to enable a translational movement according to the Y axis (perpendicular to the sliding X axis) of the shuttle. Such a degree of freedom allows disengaging/removing the corresponding shuttle off the guide rail without any intervention on the stationary portion. Thus, it is possible to completely dismount the movable subassembly, comprising the movable panel and a guide shuttle, relative to the stationary subassembly, comprising the stationary portion and the guide rails, which remains secured to the structure.

Thus, the invention allows facilitating maintenance operations of the closure device without the need to completely dismount the closure device off the structure in which it is mounted. In other words, it is possible to leave the stationary subassembly secured to the structure during maintenance operations requiring no dismount, which is not the case in the techniques of the prior art.

In other words, at least one of the rails carries a movable element carrying a guide portion of the movable panel. Depending on the implementations, this movable element may be translationally and/or rotationally movable relative to the rail between a functional position (or of securing to the rail), in which it ensures holding and/or guidance of the movable panel, and a release position, enabling removal of the movable panel.

Thus, according to another aspect of the invention, at least one of said guide rails carries a guide element translationally and/or rotationally movable relative to said rail between a functional position and a release position, with a length at least equal to the length of said shuttle, allowing, in said release position, disengaging said shuttle from said guide rail.

Depending on the implementations, said movable guide element may be completely removed, or separated, from the rail, or remain secured to the latter, in said securing position.

According to a particular aspect of the invention, said removable guide element is movable in a direction parallel to said guide rail, between a position of securing to the rail and a release position.

According to a particular embodiment of the invention, in said release position, said removable guide element is movable in at least one direction perpendicular to said guide rail, so as to be separated from the latter.

Thus, to remove/separate the removable guide element from the guide rail, it is necessary, at first, to impart a movement in a direction parallel to the guide rail (according to the X axis) and then in a direction perpendicular to the guide rail (according to the Y axis). Of course, other mount/dismount kinematics, in the X axis and then in the Z axis for example, may be considered. These two successive movements allow disengaging the removable guide element. This double movement also allows avoiding any undesired or accidental removal of the removable guide element.

According to a particular embodiment of the invention, said guide rail, respectively said removable guide element, carries at least one hook able to be secured to a corresponding compartment formed in said removable guide element, respectively said rail, in said securing position.

Such means for securing the removable guide element on the guide rail are very simple to implement, inexpensive and reliable. These securing means provide a simple technical solution for obtaining the double disengagement movement according to the X axis and then the Y axis. Other holding solutions, for example a screw or any other suitable connecting element, may be implemented.

According to another particular aspect of the invention, the closure device comprises at least two similar hooks, distributed according to an axis parallel to the axis of said guide rail.

Thus, guidance and holding of the removable guide element relative to the guide rail is optimised.

According to still another particular aspect of the invention, said guide rail has a groove for guiding said removable guide element along said rail.

Such a groove allows ensuring optimum guidance of the removable guide element according to the X axis during passage thereof from the securing position into the release position, and vice versa.

According to another particular aspect of the invention, said removable guiding element has a second portion for holding and/or guiding said shuttle, extending a first holding and/or guide portion formed in said guide rail.

Hence, the removable guide element has a shape corresponding to the guide rail to ensure optimum guidance of the upper shuttle (i.e. with no additional friction, jerks, etc.).

According to still another particular aspect of the invention, said removable guide element carries an end portion intended to be in abutment with a trim element of a vehicle.

In particular, this end portion allows forming a "wall" against the passage of light.

The invention also relates to a motor vehicle comprising at least one closure device as described before.

LIST OF THE FIGURES

The invention, as well as the different advantages that it has, will be more easily understood, in light of the following description of an illustrative and non-limiting embodiment thereof, and from the appended drawings, wherein.

DETAILED DESCRIPTION OF THE INVENTION

Next, an embodiment of the invention, considered merely as an illustrative and non-limiting example, is illustrated with reference to FIGS. 1 to 6.

General Operation of the Aperture

Figure 1:
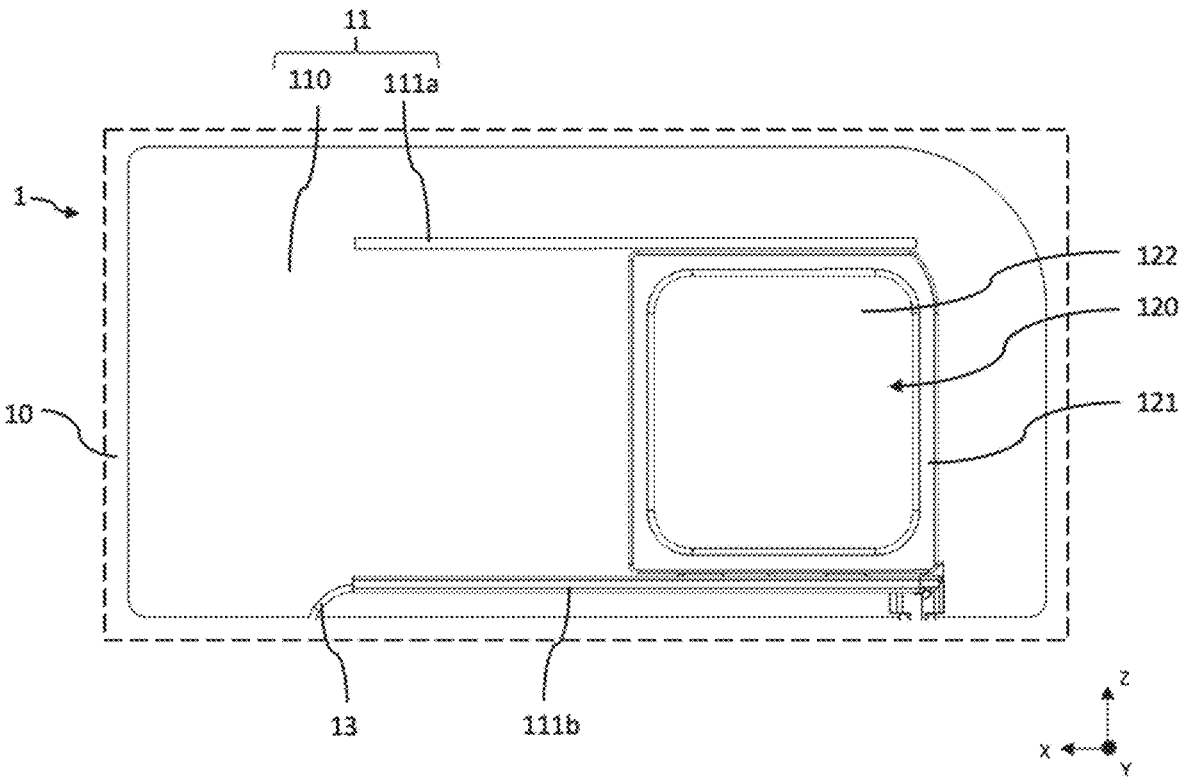
FIG. 1 illustrates an example of a closure device, or flush aperture.

FIG. 1 illustrates a flush aperture with a sliding movable panel viewed from inside the vehicle.

Such a flush aperture 1 is in the form of an assembly, or closure device, ready to be placed in an aperture (i.e. an opening, or a "hole") formed in the body 10 (side wall for example) or a door, or more generally in the structure of a vehicle (or of a caravan or a campervan, for example), or more generally of a wall intended to receive a closure device provided with an opening leaf. To simplify understanding of the invention, the body 10, also so-called a structure, well-known in the prior art, is schematically shown in broken lines.

Such a closure device comprises a stationary portion 110, i.e. remaining stationary relative to the structure 10 that receives it, and a sliding movable panel, or sliding panel, 120, movable relative to the stationary portion 110.

In particular, the stationary portion 110, also so-called stationary panel, may be made of glass or polycarbonate, in one or more element(s).

The stationary portion 110 is pierced with an opening closed by the movable panel 120 in the position of FIG. 1 and extending in the same plane as the stationary portion 110.

Figure 2:
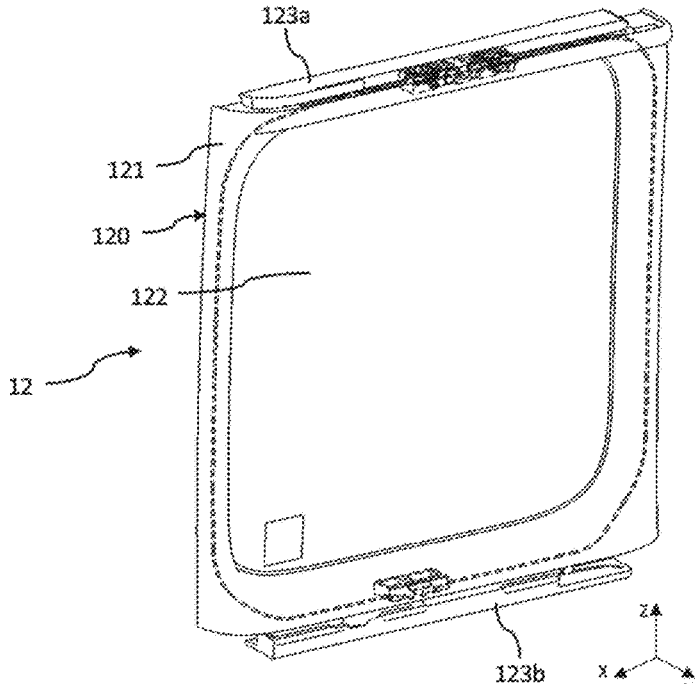
FIG. 2 illustrates the movable subassembly of the closure device of FIG. 1.

In particular, this movable panel 120 includes a glazed portion 122 and a frame 121, as illustrated in FIG. 2.

Guide rails, respectively an upper rail 111a and a lower rail 111b, are attached, for example by gluing, onto the face of the stationary portion 110 directed towards the inside of the vehicle.

The stationary portion 110 and the rails 111a, 111b form a stationary subassembly 11 of the closure device 1.

It should be noted that these rails are away from the contour of the stationary portion 110, and do not contribute in, or affect, securing thereof to the edge of the aperture.

The rails 111a and 111b, which are substantially parallel in this example, hold and slidably guide the movable panel 120, which has a frame 121 secured to the rails 111a, 111b.

The movable panel 120 can be moved along the rails 111a, 111b, in a sliding plane substantially parallel to the plane defined by the stationary portion 110.

The movable panel 120 can completely close off the opening of the stationary portion 110 (FIG. 1) or partially or totally clear this opening (not shown).

Thus, the movable panel 120 can take on one or more open position(s), depending on its position with respect to the rails 111a, 111b.

Moreover, the movable panel 120 can move perpendicularly to the plane defined by the stationary portion 110, so as to close off the opening, in a closed position (FIG. 1), in which it is flush with this stationary portion 110, so as to provide a flush assembly (body 10, stationary portion 11 and movable portion 12).

Moreover, the face of the stationary portion 110 directed towards the inside of the vehicle carries a seal (not shown) glued onto the contour of the opening, the end of the lip of which bears on the movable panel 120, when the latter is in the closure position. In one variant, the seal may be mounted on the frame 121 of the movable panel 12, to come into contact with the stationary portion 110.

The upper rail 111a carries an upper shuttle 123a and the lower rail 111b carries a lower shuttle 123b, each of the shuttles carrying two grooves (not illustrated), or tracks, located respectively in the vicinity of each lateral edge of the movable panel 120 and cooperating with a front and rear pin (not illustrated) secured to an edge of the movable panel 120.

Thus, each shuttle 123a, 123b is slidably guided in a rail 111a, 111b, according to an axis parallel to the X axis, i.e. the axis corresponding to the length of the vehicle.

Hence, the rails are able to receive the shuttles so that these could slide longitudinally in the rails according to the X axis. Thus, the rails are simple and inexpensive to manufacture, since they ensure guidance according to one single axis, the shuttles taking care of the movement according the Y axis.

The tracks formed in the shuttles 123a, 123b allow, during movement of the shuttles, driving the movable panel and enabling movement thereof, according to the X and Y axes, between the closed position and the opening position(s).

The movable panel 120 and the shuttles 123a, 123b form a movable subassembly 12 of the closure device 1.

The different movements of the movable panel 120 are controlled from means for moving the shuttles 2, 3 inside the guide rails 111a, 111b.

The movement of the lower shuttle 123b along the lower guide rail 111b is ensured by means of a "push pull" type control cable, or drive cable, 13, itself driven by motor-driven means controlled by a user.

More specifically, the drive cable 13 is intended either to push on the lower shuttle 123b (in the direction of the X axis, i.e. towards the rear of the vehicle) to move the movable panel 120 from its closed position towards one of the open positions, or to pull the lower shuttle 123b (in a direction opposite to the X axis, i.e. towards the front of the vehicle) to move the movable panel 120 from an open position towards its closed position.

In this example, the drive cable 13 is pushed or pulled by a motor (not illustrated).

Figure 3:
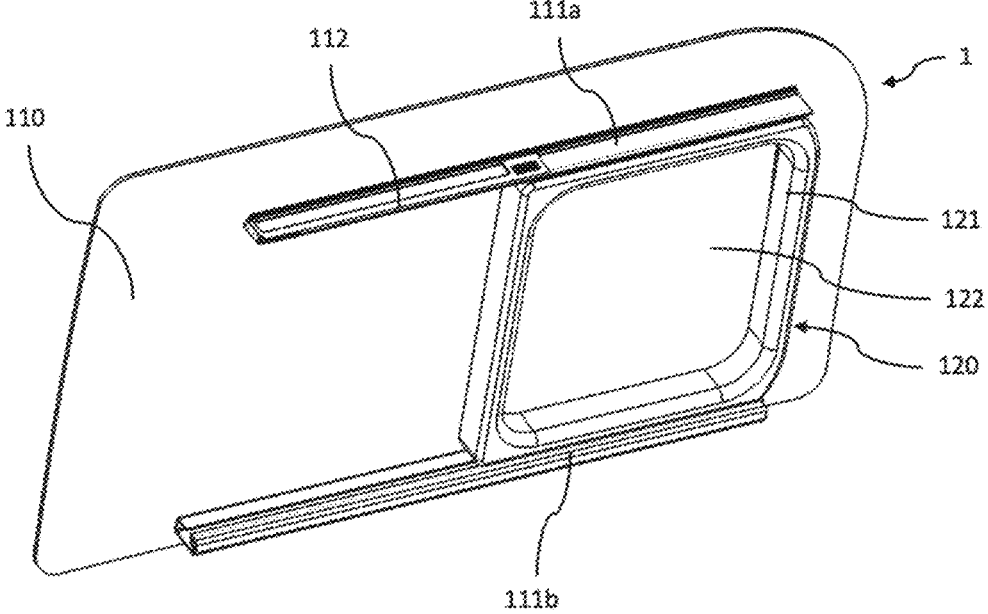
FIG. 3 illustrates an overall perspective view of a closure device according to the invention.
Figure 6:
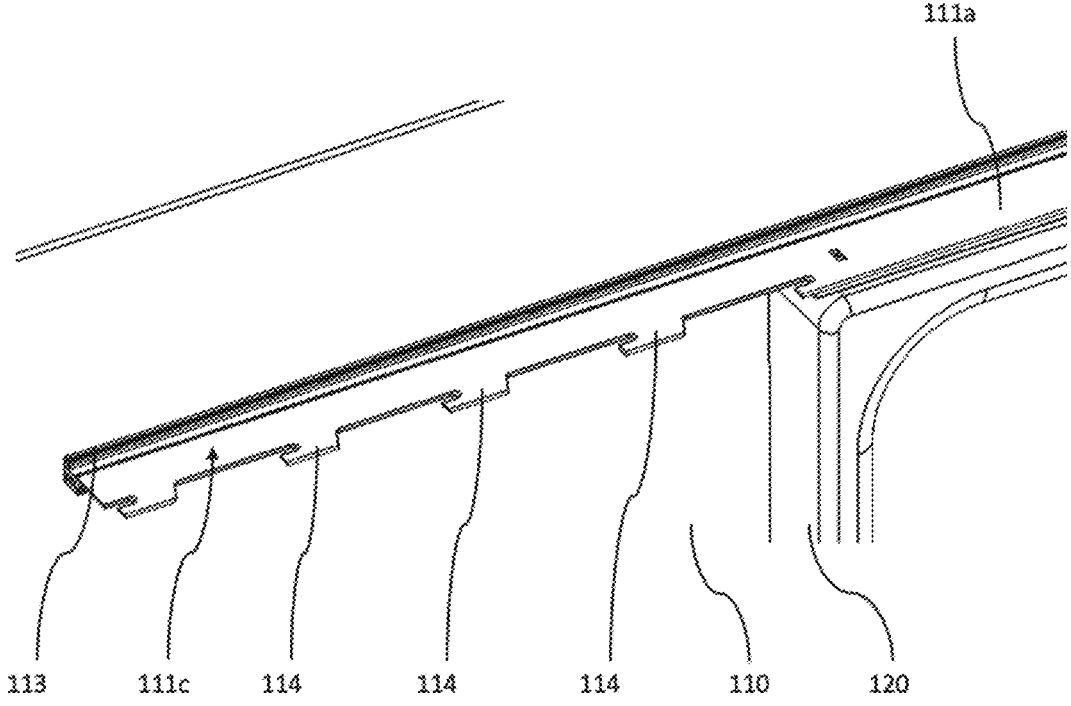
FIG. 6 illustrates a detail view showing the guide rail after removal of the removable guide element of FIG. 5.

Description of an Example of a Removable Guide Element According to the Invention FIGS. 3 and 6 illustrate a closure device according to the invention wherein at least guide rails are provided with a removable guide element.

FIG. 3 illustrates the closure device 1 of the invention in a conventional use position, corresponding to a completely mounted position/state of the closure device 1 in the opening formed in the body 10.

Figure 4:
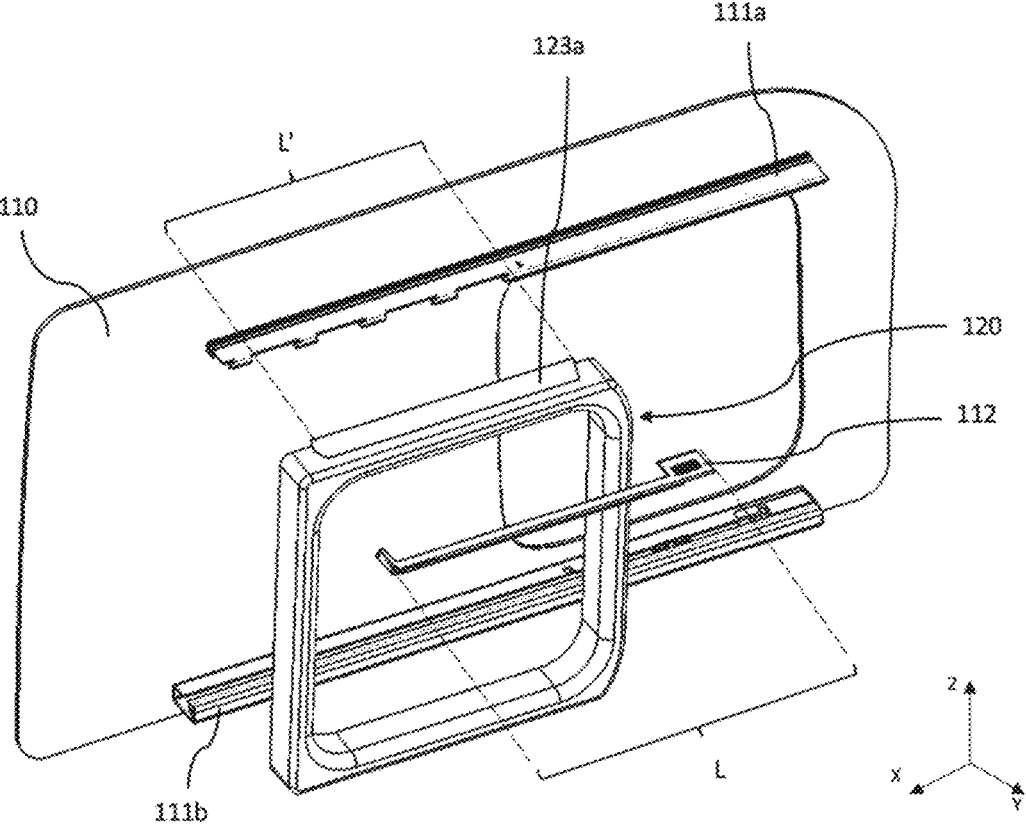
FIG. 4 illustrates a partially exploded view of the closure device of FIG. 3.

FIG. 4 illustrates the closure device 1 of the invention in a dismounted position/state, in which a removable guide element 112 is dismounted/removed so as to release the movable subassembly 12.

In this example, the upper rail 111a carries the removable guide element 112. This removable guide element 112 forms a portion of the rail 111a and is able, when it is mounted/fastened on the rail 111a, to guide the upper shuttle 123a.

Hence, the removable guide element 112 is able, on the one hand, to guide the upper shuttle 123*a* when it is mounted on the upper rail 111*a* (securing position) and, on the other hand, to clear enough space to enable removal of the upper shuttle 123*a* from the upper guide rail 111*a* when it is dismounted from the upper guide rail 111*a*.

Hence, the removable guide element 112 has a shape corresponding to the profile of the upper rail 111*a* to enable guidance of the shuttle 123*a*. It further has a length L at least equal to the length L' of the upper shuttle 123*a* so that the shuttle 123*a* could be disengaged/removed from the upper rail 111*a*, through a movement according to the Y axis when the removable guide element 112 is removed.

Indeed, the removal/dismounting of the removable guide element 112 allows moving the upper shuttle 123*a* according to the Y axis so as to pull out/disengage the upper shuttle 123*a* from the guide rail 111*a*. Hence, the removal of the removable guide element 112 allows releasing a degree of freedom (in translation) according to the Y axis for the upper shuttle 123*a*.

Figure 5:
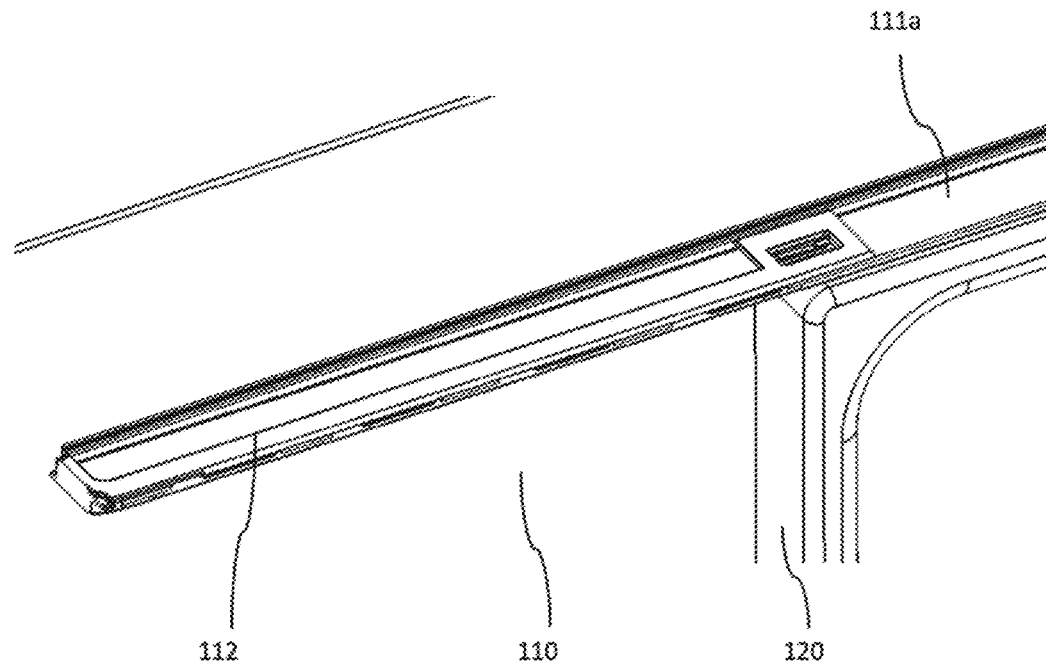
FIG. 5 illustrates a detail view showing the removable guide element mounted on the guide rail of the closure device of FIG. 3.

FIG. 5 illustrates in detail the removable guide element 112 when it is mounted on the upper guide rail 111*a*, corresponding to the securing position of the removable guide element 112.

FIG. 6 illustrates in detail the receiving portion 111*c* of the upper guide rail 111*a* able to receive the removable guide element 112. In this figure, the removable guide element 112 is separated/removed from the upper guide rail 111*a* and is therefore not illustrated.

In the securing position illustrated in FIG. 5, the removable guide element 112 and the receiving portion 111*c* together form an extension of the upper guide rail 111*a* so as to ensure optimum guidance of the upper shuttle 123*a*.

Hence, the removable guide element 112 has a shape corresponding to the upper guide rail 111*a* to ensure optimum guidance of the upper shuttle 123*a*. To do so, the removable guide element 112 has a second portion for holding and/or guiding the upper shuttle 123*a* extending a first holding and/or guide portion formed in the upper guide rail 111*a*.

As illustrated in FIG. 6, the receiving portion 111*c* of the guide rail 111*a* has, in this example, three securing hooks 114. The receiving portion 111*c* should have at least one hook. The implementation of three hooks 114 enables effective and reliable securing of the removable guide element 112.

All hooks 114 are similar and are distributed substantially evenly over the edge of the receiving portion 111*c* according to an axis parallel to the axis of the upper guide rail 111*a* (according to the X axis).

The hooks 114 have a first section extending from the edge of the receiving portion 111*c* towards the inside of the vehicle and a second section, extending the first section, extending towards the rear of the vehicle, namely according to an axis parallel to the upper guide rail 111*a* (according to the X axis).

Each hook 114 is intended to cooperate with/to be secured to a respective compartment (not illustrated) carried by the removable guide element 112.

Of course, it should be understood that the hooks could be carried by the removable guide element and that the compartments are formed on the guide rail, yet without departing from the general principle of the invention.

Thus, in order to remove the removable guide element 112, it is necessary to move the latter in a direction parallel to the upper guide rail 111*a* (herein towards the rear of the vehicle or according to the X axis). This first movement allows moving the removable guide element 112 between a securing position (illustrated in FIG. 5) and a release position (not illustrated).

Preferably, the second section of the hooks has a relatively small length so that the movement according to the direction parallel to the guide rail (according to the X axis) for passage from the securing position into the release position is short in order to take account of the limited space separating the end of the guide rail and the edges of the closure device 1.

In the release position, the removable guide element 112 is then free to be moved according to at least one direction perpendicular to the upper guide rail 111*a*, i.e. the removable guide element 112 can be moved according to the Y axis so as to be removed/separated from the guide rail 111*a*.

As illustrated in FIG. 6, the receiving portion 111*c* has a guide groove 113 extending according to an axis parallel to the upper guide rail 111*a* (i.e. according to the X axis). This guide groove 113 is intended to guide the movement of the removable guide element 112 along the rail 111*a* during movement thereof according to the X axis, i.e. during passage from the securing position into the release position, and vice versa.

Once the removable guide element 112 is removed/separated from the guide rail 111*a*, it is then easy to remove the shuttle 123*a*, 123*b* off the guide rail, through a translational movement according to the Y axis. Thus, the movable subassembly 12 can be detached from the stationary subassembly 11 to facilitate maintenance operations on the closure device 1.

Other Aspects and Variants

In the above-described embodiment, the removable guide element 112 is implemented on the upper guide rail 111*a*. Of course, it should be understood that the removable guide element 112 could be implemented on the lower guide rail 111*b*. It could also be implemented on the upper 111*a* and lower 111*b* guide rails in order to further facilitate the separation/dismount of the stationary and movable subassemblies from one another.

In the above-described embodiment, the means for fastening the removable guide element on the guide rail are in the form of hooks and corresponding compartments. Of course, it should be understood that other fastening means may be considered yet without departing from the general principle of the invention which aims to equip at least one guide rail with a removable element so as to enable removal of the shuttle from the guide rail.

According to a particular aspect, holding means (not illustrated) are implemented to hold the removable guide element in the securing position. For example, these holding means are in the form of holding clips or screws.

In a non-illustrated variant, it is possible to consider not completely separating the removable guide element from the guide rail. For example, the removable guide element could pivot relative to the guide rail, thereby forming a pivoting cowl.

For example, the removable guide element 112 is manufactured in a plastic material in order to limit its manufacturing cost. Preferably, the removable guide element 112 is manufactured in the same material as the guide rail 111*a*, 111*b* so as to ensure a movement that is at least as effective in the removable guide element as in the guide rail. The removable guide element 112 should also have an aesthetically-pleasant appearance equivalent to the guide rail 111*a*, 111*b* on which it is mounted.

In another variant which is not illustrated, the removable guide element carries, opposite the guide rail, an end portion intended to be docked (i.e. in contact/in abutment) with a trim element of the vehicle. Such a docking portion, formed by an excrescence or continuity of the rail (continuity of the support rib Z), also serves as a wall against the passage of light.

The above-described embodiment applies to a side wall of a motor vehicle. The invention may be applied in the same way to other structures having a wall in which an aperture is defined, like, for example, a caravan or a campervan.

In particular, the aperture may be formed in a side wall of the vehicle (for example for commercial vehicles, mono-spaces, breaks, etc.), in a wall directed towards the rear of the vehicle (for example for "pick-up" trucks), or in a door.

For example, it may also consist of a separation aperture of a vehicle.

The invention claimed is:

1. A device for closing off an opening formed in a structure, comprising a stationary portion, in which the opening is defined, and at least one sliding movable panel guided along two guide rails mounted on a face of said stationary panel, between a closure position, closing off said opening, in a first plane defined by said stationary panel, called closure plane, and at least one opening position, in a second plane, called sliding plane, substantially parallel to said closure plane, each of said guide rails carrying at least one shuttle translationally guided in said rail, translationally movable in said guide rails, and ensuring passage of the movable panel from said closure position into said at least one opening position, and vice versa, and the sliding movement of said movable panel in said sliding plane, wherein at least one of said guide rails carries a removable guiding element with a length at least equal to the length of said shuttle, allowing, when removed, disengaging said shuttle from said respective guide rail, and wherein at least one of said guide rails carries at least one hook able to be secured to a corresponding compartment formed in said removable guiding element in a securing position, said removable guiding element being movable in a direction parallel to said at least one of said guide rails, between a position of securing to the respective rail and a release position and being movable in at least one direction perpendicular to said at least one of said guide rails, so as to be separated from the latter.

2. The device according to claim 1, further comprises at least two similar hooks, distributed on said at least one of said guide rails according to an axis parallel to the axis of said at least one of said guide rails.

3. The device according to claim 1, wherein said at least one of said guide rails has a groove for guiding said removable guiding element along said rail.

4. The device according to claim 1, wherein said removable guiding element carries an end portion intended to be docked with a trim element of a vehicle.

5. A motor vehicle comprising at least one device for closing off an opening formed in a structure, comprising a stationary portion, in which the opening is defined, and at least one sliding movable panel guided along two guide rails mounted on a face of said stationary panel, between a closure position, closing off said opening, in a first plane defined by said stationary panel, called closure plane, and at least one opening position, in a second plane, called sliding plane, substantially parallel to said closure plane, each of said guide rails carrying at least one shuttle translationally guided in said respective rail, translationally movable in said guide rails, and ensuring passage of the movable panel from said closure position into said at least one opening position, and vice versa, and the sliding movement of said movable panel in said sliding plane, wherein at least one of said guide rails carries a removable guiding element with a length at least equal to the length of said shuttle, allowing, when removed, disengaging said shuttle from said respective guide rail, and wherein at least one of said guide rails carries at least one hook able to be secured to a corresponding compartment formed in said removable guiding element in said securing position, said removable guiding element being movable in a direction parallel to said guide rails, between a position of securing to the respective rail and a release position and being movable in at least one direction perpendicular to said guide rails, so as to be separated from the latter.

6. A device for closing off an opening formed in a structure, comprising a stationary portion, in which the opening is defined, and at least one sliding movable panel guided along two guide rails mounted on a face of said stationary panel, between a closure position, closing off said opening, in a first plane defined by said stationary panel, called closure plane, and at least one opening position, in a second plane, called sliding plane, substantially parallel to said closure plane, each of said guide rails carrying at least one shuttle translationally guided in said respective rail, translationally movable in said guide rails, and ensuring passage of the movable panel from said closure position into said at least one opening position, and vice versa, and the sliding movement of said movable panel in said sliding plane, wherein at least one of said guide rails carries a removable guiding element with a length at least equal to the length of said shuttle, allowing, when removed, disengaging said shuttle from said respective guide rail, and wherein said removable guiding element carries at least one hook able to be secured to a corresponding compartment formed in said at least one of said guide rails in a securing position, said removable guiding element being movable in a direction parallel to said at least one of said guide rails, between a position of securing to the respective rail and a release position and being movable in at least one direction perpendicular to said at least one of said guide rails, so as to be separated from the latter.

* * * * *